Aug. 22, 1967 N. H. BROWN 3,337,807
SUPERREGENERATIVE AMPLIFIER-DETECTOR
Filed Sept. 17, 1963
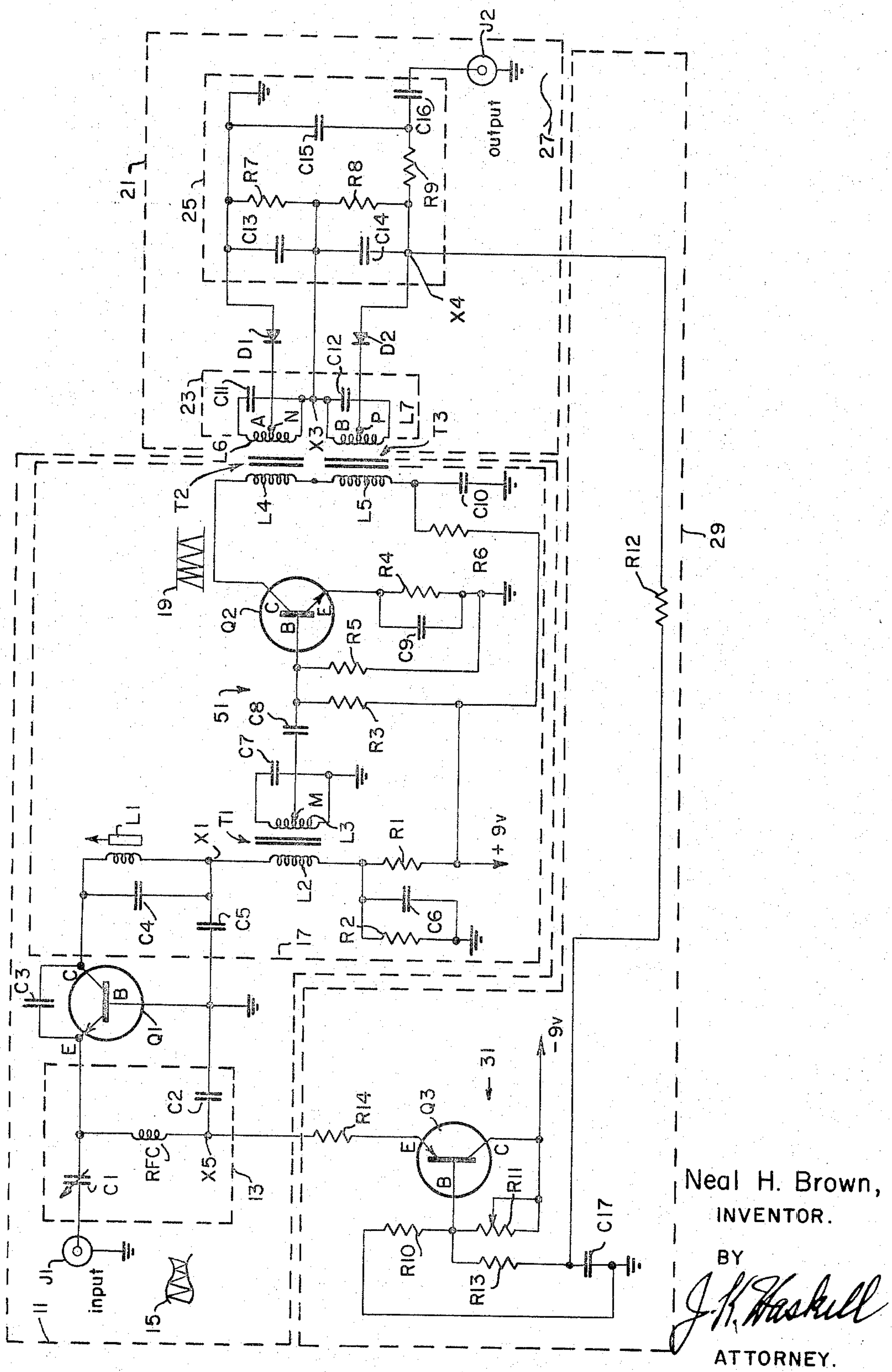
Neal H. Brown,
INVENTOR.
BY
J. K. Haskell
ATTORNEY.

United States Patent Office 3,337,807
Patented Aug. 22, 1967

3,337,807
SUPERREGENERATIVE AMPLIFIER-DETECTOR
Neal H. Brown, Tucson, Ariz., assignor to Hughes Aircraft Company, Culver City, Calif., a corporation of Delaware
Filed Sept. 17, 1963, Ser. No. 309,466
2 Claims. (Cl. 325—429)

This invention relates to a superregenerative amplifier-detector and more particularly to a superregenerative amplifier-detector utilizing modulated quench frequency detection.

It has long been recognized that a superregenerative amplifier is capable of providing very high gain in a single stage, but also that this type of amplifier has an inherent overly broad bandwidth and a poor signal-to-noise ratio. Accordingly, the usefulness of this type of amplifier has greatly diminished with the discovery and use of the tuned radio frequency (TRF) and superheterodyne circuits which exhibit much more favorable bandwidth and signal-to-noise characteristics but do not have the single stage gain available in a superregenerative system.

As is well known, superregenation is a form of regeneration in which an alternating quenching voltage, usually in the range between 20 and 200 kc., is used to interrupt the normal oscillation of a regenerative amplifier-detector. One possible mode of operation of this type of device is called self-quenching logarithmic operation. Here, the bias circuit components of the superregenerative stage are chosen such that interrupted oscillations are generated. A more complete description of the fundamentals and operation of this type of circuit may be obtained by referring to such texts covering this field as the "Radio Engineers' Handbook," by F. E. Terman, published by McGraw-Hill Book Co., Inc., New York, 1943, pp. 662–664, and the MIT Radiation Laboratory Series, vol. 23, chapter 20.

In the past, superregenerative amplifier-detectors were usually provided with an audio-frequency filter to remove the quench frequency energy from the output signal of the device, since this energy has spent its usefulness, and if carried on through the output, would cause unwanted interference.

In contradistinction to the manner in which previous superregenerative amplifier-detectors were designed, the present invention utilizes this formerly undesired quench frequency energy to a significant advantage. In the present invention, the quench frequency energy of a self-quenching superregenerative stage is used to provide a frequency modulated (FM) signal corresponding to the modulation of an RF input signal, which FM signal is detected by a discriminator stage to provide an output signal corresponding to the modulation of the input RF signal.

This is possible since it has been found that in the operation of a self-quenched logarithmic superregenerative stage much of the modulation of the received RF input signal appears on the quench waveform as frequency modulation. This is due to the shift in the start and decay time of the quench cycle with the presence of a modulated input signal. Advantage is taken of this FM effect to recover the original modulation component of the input signal. Another advantage is that the recovered modulation component is of higher quality than available from prior superregenerative stages.

It is, therefore, an object of the present invention to provide an improved superregenerative amplifier-detector.

It is a further object of the invention to provide an amplifier-detector which has a very high single stage gain over a relatively narrow bandwidth with a high signal-to-noise ratio of the order of 10 db.

These and other objectives are achieved, according to to the invention, in a superregenerative amplifier-detector comprising a self-quenching superregenerative stage having an input circuit means for coupling to a modulated radio frequency signal, and having output circuit means providing a frequency modulated quench frequency signal. The amplifier-detector also includes a discriminator stage having an input circuit arrangement coupled to the output circuit means of the superregenerative stage and responsive to the frequency modulated quench frequency signal. Further, the discriminator stage has an output circuit arrangement which provides a sub-radio frequency signal corresponding to the modulation component of the input radio frequency signal.

The invention will be described hereinafter by way of example and with reference to the accompanying drawing, in which a schematic circuit diagram illustrates a preferred embodiment of the invention.

Referring now to the drawing, a superregenerative amplifier-detector comprises a self-quenching superregenerative stage 11 having an input circuit means 13 for coupling to a radio frequency input signal 15 modulated by a modulating signal. The superregenerative stage 11 also includes an output means 17 providing a frequency modulated (FM) quench frequency signal 19. The quench signal 19 is then coupled from the output circuit means 17 to a discriminator stage 21 through an input circuit arrangement 23 which is responsive to the quench signal 19. The discriminator stage 21 also includes an output circuit arrangement 25 for providing a sub-radio frequency output signal 27 corresponding to the aforementioned modulating signal. The amplifier-detector may also include an error signal or automatic frequency control (AFC) circuit 29 which stabilizes the nominal frequency of the quench signal 19.

A more detailed description of the operation and circuitry of the invention as shown in the diagram may be stated as follows: The modulated radio frequency input signal 15 is coupled to the superregenerative stage 11 by means of an input terminal J1. The input signal 15 is then coupled from the input terminal J1 through a variable input capacitor C1 to the emitter electrode of an n-p-n junction transistor Q1. The transistor Q1 is basically a grounded base oscillator with collector-to-emitter feedback operating in a self-quenching mode at a 25 kc. rate determined by the emitter current and the base and emitter bias network time constants. The proper feedback is provided by a feedback capacitor C3 connected between the emitter and collector electrodes of the transistor Q1, and the stage is tuned to the frequency of the input signal 15 by parallel tank circuit comprising a tunable inductor L1 and a capacitor C4. One side of the parallel tank circuit is connected to the collector electrode of the transistor Q1, while the other side is connected through a bypass capacitor C5 to the base electrode of Q1 and to a point of fixed reference potential or ground.

The modulation component of the input signal 15 appears as frequency modulation of the 25 kc. quench frequency signal 19 appearing at a coupling transformer T1 which is included in a quench frequency amplifier circuit 51. The coupling transformer T1 has an untuned primary winding L2 and a secondary winding L3 tuned to resonance at the quench frequency of 25 kc. by a shunt connected capacitor C7. One side of the primary winding L2 is connected to the L1–C4 tank circuit at a junction X1 and the other side of the primary winding L2 is connected through a voltage dropping resistor R1 to the positive terminal of a 9-volt potential source (not shown), the negative terminal of which is grounded, and also to a parallel R-C filter network comprising a resistor R2 and a capacitor C6, to ground. The quench frequency energy is converted to sine waveform by tuned secondary circuit of the transformer T1. The quench frequency energy is then coupled to an n-p-n transistor Q2 by means of a coupling capacitor C8 connected between a tap M on the winding L3 and the base electrode of the transistor Q2.

Proper operating voltages for amplification are supplied to the transistor Q2 by means of resistor R3 connected between the base electrode of Q2 and the positive terminal of the 9-volt potential source, and by a resistor R6 connected to said source and the collector electrode of transistor Q2 through series-connected primary windings L4 and L5 of transformers T2 and T3, respectively. Proper emitter-based bias for the transistor Q2 is provided by a resistor R5 connected between the base electrode and ground, and by a parallel R-C combination comprising resistor R4 and capacitor C9 connected between an emitter electrode of Q2 and ground.

The quench frequency signal 19, as amplified by the transistor Q2, appears across the series-connected primary windings L4 and L5 of the discriminator coupling transformers T2 and T3. The quench frequency signal 19 is prevented from being coupled to the 9-volt potential source by a bypass capacitor C10 connected between ground and the junction of the resistor R6 and winding L5. The transformers T2 and T3 make up the input circuit arrangement 23 of the modified Travis type discriminator stage 21 which stage recovers the original modulation of the input signal 15. The secondary windings L6 and L7 of the transformers T2 and T3, respectively, are tuned to resonance at the quench frequency by means of capacitor C11 shunted across the first secondary winding L6 and by means of capacitor C12 shunted across the other secondary winding L7. One side of the secondary windings L6 and L7 are connected together at a junction X3.

That portion of the quench signal appearing across the first secondary winding L6 is coupled to one side of the balanced output circuit arrangement 25 through the anode-to-cathode path of a first discriminator diode D1 connected to a tap N on the first secondary winding L6 and that portion of the quench signal appearing across the other secondary winding L7 is coupled to the other side of the balanced output circuit arrangement 25 through the anode-to-cathode path of a second discriminator diode D2 connected to tap P on the other secondary winding L7.

The output circuit arrangement 25 of the discriminator stage 21 includes a parallel resistor R7-capacitor C13 combination connected between the cathode electrode of the diode D1, which is connected to ground, and the common junction X3. Also, an identical parallel resistor-capacitor combination comprising in this case resistor R8 and capacitor C14 is connected between the cathode electrode of the diode D2 at a junction X4, and the common junction X3.

The sub-radio frequency output signal 27 first appears across a capacitor C15 which is connected between ground and the common junction X4 in series with a resistor R9. The output signal 27 is coupled to an output terminal J2 by means of an output coupling capacitor C16 connected to the junction of the capacitor C15 and the resistor R9.

The discriminator stage 21 also develops a direct current (DC) error signal or AFC voltage at the junction X4. The AFC voltage is coupled to an AFC circuit 29 through a resistor R12 and a resistor R13 to the base electrode of a p-n-p transistor Q3 included in a bias control stage 31. The base electrode of the transistor Q3 is also connected through a resistor R10 to ground and is further connected through a variable resistor R11 to the negative terminal of another 9-volt potential source (not shown), the positive terminal of which is grounded, to which terminal the collector electrode is also connected. The junction between the resistor R12 and R13 is bypassed to ground by a bypass capacitor C17. The bias control stage 31 acts as a variable resistor to supply a controlled bias voltage to the transistor Q1 of a superregenerative stage 11. The base-emitter bias voltage for transistor Q1, which is effective to control the quench frequency of the superregenerative stage 11, is supplied from the emitter electrode of the transistor Q3 through a resistor R14 connected to a common junction X5 between an RF choke RFC and a bypass capacitor C2 of the input circuit means 13. Thus, the AFC voltage maintains the emitter current of the transistor Q1 at a value required to produce the 25 kc. quench rate. The AFC voltage is derived from the discriminator stage 21 by means commonly known in the art and will not be described in detail here.

The initial emitter current level of Q1 controlled by the transistor Q3 is set initially by the variable resistor R11. With the addition of the AFC circuit 29, the device becomes a closed-loop system where the bandwidth is primary a function of the effectiveness of the AFC voltage loop, its time constants and the bandwidth of the discriminator. This operation is similar to a phase locked system and results in three things: improved signal-to-noise ratio, increased sensitivity, and narrow bandwidth.

The values of the various components which have been used in the illustrated embodiment shown in the circuit diagram are:

| | | |
|---|---|---|
| R1 | ohms | 20,000K |
| R2 | do | 10K |
| R3 | do | 47K |
| R4 | do | 100 |
| R5 | do | 10K |
| R6 | do | 100 |
| R7 | do | 33K |
| R8 | do | 33K |
| R9 | do | 4.7K |
| R10 | do | 10K |
| R11 | do | [1] 50K |
| R12 | do | 33K |
| R13 | do | 18K |
| R14 | do | 300 |
| C1 | pf | [1] 1–10 |
| C2 | μf | .05 |
| C3 | pf | 12 |
| C4 | pf | 20 |
| C5 | pf | 500 |
| C6 | μf | 20 |
| C7 | pf | 750 |
| C8 | μf | .0005 |
| C9 | μf | 10 |
| C10 | μf | 10 |
| C11 | pf | 1000 |
| C12 | pf | 330 |
| C13 | μf | .01 |
| C14 | μf | .01 |
| C15 | μf | .02 |
| C16 | μf | 2 |
| C17 | μf | 50 |
| RFC | μh | 50 |
| L1 | μh | 12 |
| T1, T2, T3 | | ([2]) |
| Q1 | | 2N706 |
| Q2 | | 2N335 |
| Q3 | | 2N651A |
| D1 | | ([3]) |

[1] Variable.
[2] Pri. 100 turns, sec. 200 turns; #40 HF wire wound on ferroxcube cores; Type 7F–160.
[3] Any matched pair discriminator type diodes.

When the circuit shown was used as a 10 mc. IF amplifier and second detector in an experimental VHF superheterodyne, excellent results were obtained for both AM and narrow band FM signals, the circuit described providing a gain of 100 db with a signal-to-noise ratio of 10 db.

It should be obvious that even though specific components and circuits have been described in detail, other values, components and analogous circuits may be utilized within the teachings of the invention. For example, vacuum tubes may be substituted for the transistors, or the type of transistors may be changed with an appropriate change in the operating potentials and polarities. Furthermore, the type of discriminator described is only one of several that will perform a like function.

It should also be obvious that, depending on the magnitude of the input signal and on the output requirements, the quench frequency amplifier stage 51 may be eliminated or expanded to provide a lesser or greater gain, respectively. Furthermore, the AFC circuit 29 may be deleted where the quench frequency signal generated by the superregenerative stage 11 may be made stable by other means such as voltage regulation, temperature compensation and the like.

From the foregoing it can be seen that there is achieved an improved superregenerative amplifier-detector which has a very high single stage gain (100 db) over a relatively narrow bandwidth ($\sim$ 20 kc.) with a high signal-to-noise ratio of the order of 10 db.

It should be realized that the foregoing disclosure and showings made in the drawing should be considered only as illustrations of the principles of the invention and should not be construed in a limiting sense.

What is claimed is:

1. A superregenerative amplifier-detector comprising: a self-quenching superregenerative stage having input circuit means for coupling to a radio frequency signal modulated by a modulating signal, and having output circuit means providing a frequency modulated quench frequency signal; a discriminator stage having an input circuit coupled to said output circuit means and responsive to said frequency modulated quench frequency signal, and having an output circuit providing a sub-radio frequency output signal corresponding to said modulating signal, and also providing a direct current error signal voltage when the frequency of said quench frequency signal deviates from a predetermined frequency, the polarity of said error signal voltage being dependent on the direction of said deviation; and automatic frequency control means including a variable bias voltage control circuit coupled to said discriminator stage and to said superregenerative stage, said automatic frequency control means being responsive to said error signal voltage to provide a bias voltage to said superregenerative stage for controlling the frequency of said quench frequency signal.

2. A superregenerative amplifier-detector comprising: a self-quenching superregenerative stage having input circuit means for coupling to a radio frequency signal modulated by a modulating signal, and having output circuit means providing a frequency modulated quench frequency signal, said output circuit means including a quench frequency amplifier stage responsive to and amplifying said quench frequency signal; a discriminator stage having an input circuit coupled to said output circuit means and responsive to said frequency modulated quench frequency signal, and having an output circuit providing a sub-radio frequency output signal corresponding to said modulating signal, and also providing a direct current error signal voltage when the frequency of said quench frequency signal deviates from a predetermined frequency, the polarity of said error signal voltage being dependent on the direction of said deviation; and automatic frequency control means including a variable bias voltage control circuit coupled to said discriminator stage and to said superregenerative stage, said automatic frequency control means being responsive to said error signal voltage to provide a bias voltage to said superregenerative stage for controlling the frequency of said quench frequency signal.

References Cited

UNITED STATES PATENTS

| | | | |
|---|---|---|---|
| 2,577,782 | 12/1951 | Loughlin | 325—350 |
| 2,584,132 | 2/1952 | Kirkman | 325—429 |
| 2,748,267 | 5/1956 | Richman | 325—429 |
| 2,764,687 | 9/1956 | Buchanan | 331—8 |

KATHLEEN H. CLAFFY, *Primary Examiner.*

R. P. TAYLOR, *Assistant Examiner.*